(No Model.)
L. H. WOODEN.
CARRIAGE FENDER.
No. 309,675. Patented Dec. 23, 1884.
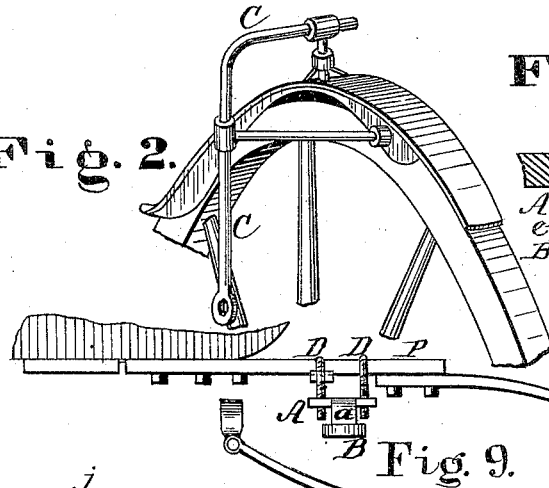
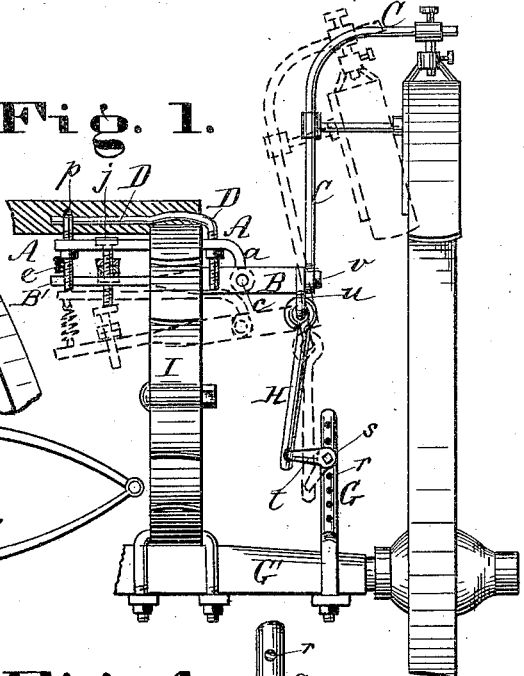
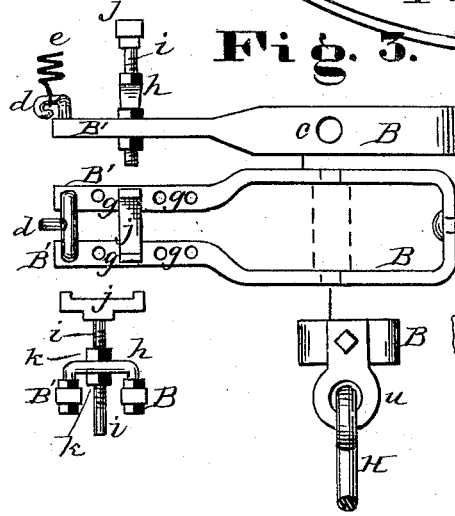
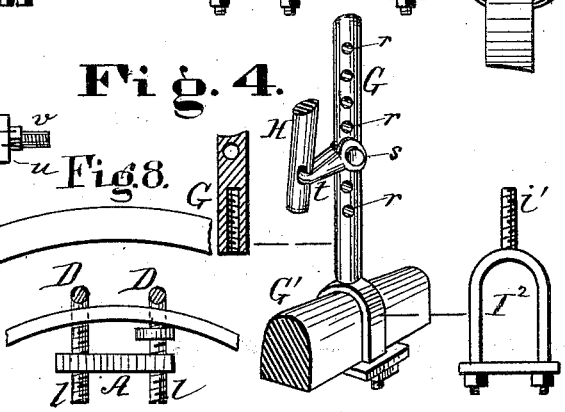
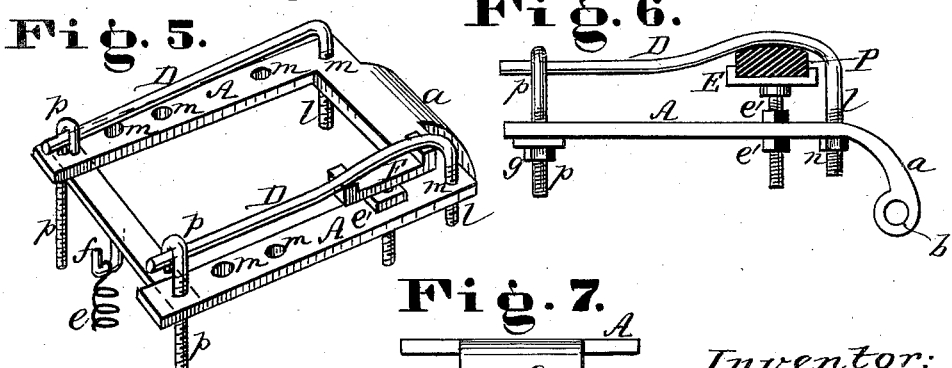
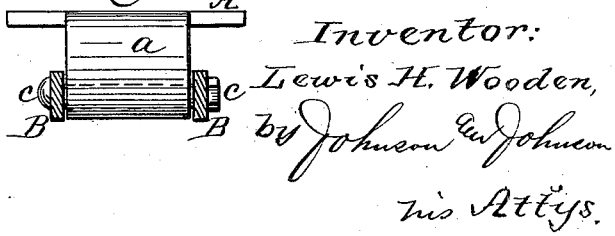
Witnesses:
Inventor:
Lewis H. Wooden,
by Johnson & Johnson
his Attys.

UNITED STATES PATENT OFFICE.

LEWIS H. WOODEN, OF HAMPSTEAD, MARYLAND.

CARRIAGE-FENDER.

SPECIFICATION forming part of Letters Patent No. 309,675, dated December 23, 1884.

Application filed July 10, 1884. (No model.)

*To all whom it may concern:*

Be it known that I, LEWIS H. WOODEN, a citizen of the United States, residing at Hampstead, in the county of Carroll and State of Maryland, have invented new and useful Improvements in Fenders for Carriages, of which the following is a specification.

My invention relates to means for connecting the fender proper for the wheels of a carriage with the carriage-spring, whereby said fender may be thrown out from over the wheel as the wheels enter depressions or pass over obstructions. Apparatus for such purpose, so far as I am aware, is only set forth in the schedule accompanying Letters Patent of the United States No. 223,206, granted to me December 30, 1879, to which reference is made.

The objects of my improvements on the said patented invention are, first, to provide a simpler, safer, and better construction of the fender-connection with the spring and the axle; second, to adapt such construction of fender-connection for use with C-springs, or modifications of the class so called, and to improve the means for connecting the fender carrying and adjusting devices with the axle and the spring. These objects I accomplish by the devices and their combinations and constructions hereinafter described, and illustrated in the accompanying drawings, wherein—

Figure 1:
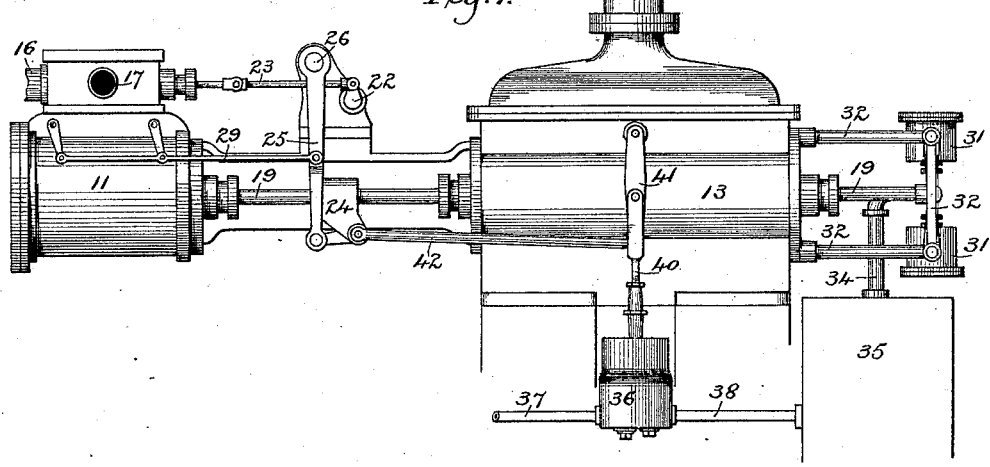
Figure 2:
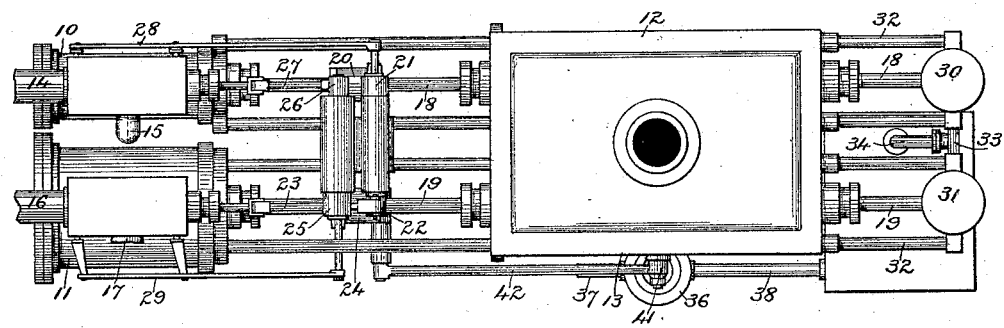

Figure 1 represents in rear elevation the fender and the devices by which it is attached to the spring and to the axle when the spring is arranged at right angles to the axle. Fig. 2 shows the fender and its supporting-rod C, which is connected to the spring and to the axle in a manner to render the fender self-adjusting in relation to the wheel, as shown in Fig. 1. Fig. 3 represents the yoke B in top, side, and end views, and the adjustable crutch $j$ which it carries. Fig. 4 represents the axle-connection G of the fender-supporting rod C. Fig. 5 shows in perspective the saddle clip or frame, which is clipped to the spring, as shown in Fig. 1, and to which the fender-supporting yoke B is pivoted, as shown in Fig. 1; Fig. 6, a side view of the saddle-clip as applied to the rear projecting bars, P, of the carriage-body. (Shown in Fig. 9.) Fig. 7 is an end view of the connected saddle-clip and yoke. Fig. 8 shows the saddle clip or frame A attached to an elliptic spring by the clamp-arms D D. Fig. 9 shows the saddle-clip adjusted upon the carriage-bars P when C-spring is used.

In my said patent I have illustrated and described means for attaching and controlling the fender by the action of the supporting carriage-spring, so that as the spring is depressed in crossing ruts it thereby elevates and carries the fender over out of contact with the wheel, and restores said fender to its normal position when the obstruction is passed and the spring resumes its normal position. In said patent I also show and describe devices for effecting such object with both that kind of carriage in which the springs are at right angles to the axle and that kind having the springs parallel with the axle.

First describing the apparatus illustrated, Figs. 1 and 2, A is a frame or saddle clip, having a depending projection, $a$, provided with an eye, $b$, for the bolt $c$, which bolt connects said frame or saddle clip with a yoke, B. This yoke B carries the supporting-arm C for the fender proper, as in my patent aforesaid, except as to its particular connection therewith, as will be hereinafter set forth. At the rear end of said yoke B there is provided a hook, $d$, Fig. 3, for the attachment of a coil or rubber spring, $e$, with a similar hook, $f$, Fig. 5, on the rear cross-bar of the said saddle clip or frame A, and the yoke B, as shown in Fig. 1, as will more fully hereinafter appear.

Upon the yoke-arms B' are holes $g\ g\ g$, Fig. 3, at intervals upon both arms B', for the adjustment and securement of a carrier, $h$, through a threaded hole in which passes the stem $i$ of a crutch, $j$, which has nuts $k\ k$, which screw upon right and left screw-threaded portions of said stem below the carrier $h$, to secure the vertical adjustment of the crutch. The crutch $j$ acts upon the bottom of the carriage-body in connection with the spring $e$, to prevent the yoke saddle or frame A from coming up against the carriage-bottom. The carriage-spring I, Fig. 1, passes over the top of the saddle-clip or frame A near the pivot-connection $b$ with the yoke B, and said frame A is confined to said spring by clamping-bars D (No Model.)  2 Sheets—Sheet 1.

C. C. WORTHINGTON.
DIRECT ACTING ENGINE.

No. 309,676.  Patented Dec. 23, 1884.

Attest:  Inventor,